United States Patent Office 3,000,862
Patented Sept. 19, 1961

3,000,862
POLYMETHACROLEIN DERIVATIVES
Robert Lee Eifert and Barnard Mitchel Marks, Wilmington, Del., assignors to E. I. du Pont de Nemours and Company, Wilmington, Del., a corporation of Delaware
No Drawing. Filed Jan. 13, 1958, Ser. No. 708,373
5 Claims. (Cl. 260—67)

The present invention relates to novel polymeric materials and more particularly to polymeric materials derived from high molecular weight, addition polymers of methacrolein.

Methacrolein and other 2-substituted acroleins possess an inherent tendency to undergo autopolymerization and form infusible, insoluble resins which are of little or no value as a plastic material. Recently, however, methods have been discovered by which it is possible to polymerize methacrolein to high molecular weight polymers which are soluble in a number of organic solvents. The polymers thus prepared have inherent viscosities substantially above 0.3, as determined by methods hereinafter defined, softening points at about 243° C., and can be molded into stiff transparent films at temperatures of 250° to 300° C. The polymethacroleins prepared by these novel methods are substantially linear addition polymers containing pendent methyl groups and pendent aldehyde groups. The aldehyde groups of the polymethacrolein impart a high chemical reactivity to the polymer which can be utilized to prepare novel and useful polymethacrolein derivatives having properties substantially modified from those of the parent polymer.

It is one of the objects of the present invention to prepare organic solvent soluble derivatives of high molecular weight polymethacrolein prepared by addition polymerization. It is another object to modify the chemical structure and the physical properties of high molecular weight polymethacrolein by reaction of the pendent aldehyde groups of the polymer. Other objects will become apparent hereinafter.

The objects of the present invention are accomplished by reacting a substantially linear high molecular weight polymer of methacrolein with a compound of the class consisting of anhydrides of carboxylic acids and non-phenolic alcohols in the presence of an acid catalyst and recovering a high molecular weight linear, organic solvent soluble resin of outstanding retention of rigidity at elevated temperatures, the infrared spectrum of which shows substantial absence of aldehyde groups. The polymers obtained by the process of the present invention differ in chemical structure from the polymers which would be expected from the normal reaction of the aldehyde group with an acid anhydride or an alcohol. Thus the expected reaction of an acid anhydride or an aliphatic alcohol with polymethacrolein is illustrated by the following chemical Equations 1 and 2:

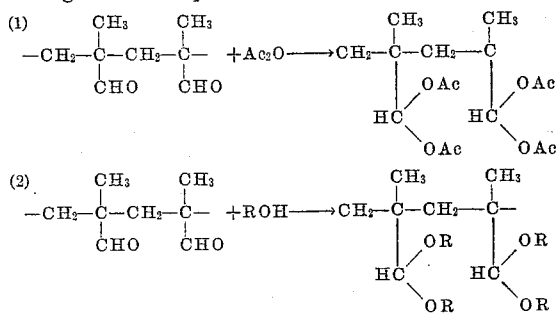

where Ac is an acyl radical and R is an alkyl radical.

However, it was discovered that the polymeric derivatives prepared by the process of the present invention contained in addition to the above recited structures the following Structures 3, 4, 5 and 6 in the polymer chain

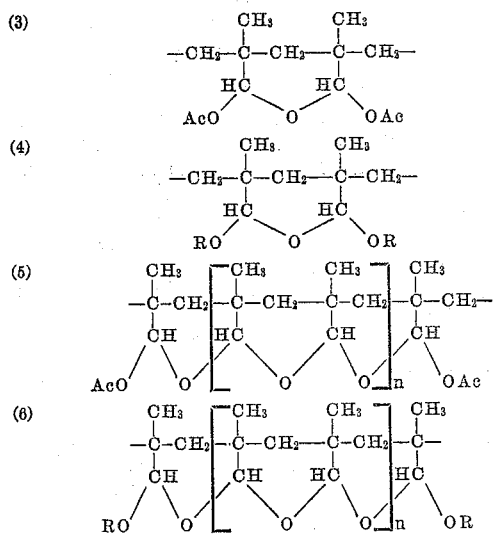

where Ac and R have the same meaning as above.

The Structures 5 and 6 are prevalent when the polymeric derivative is prepared by reaction of a solution of the polymer whereas Structures 3 and 4 are prevalent when the polymer derivative is prepared with undissolved polymer in a two-phase reaction. The existence of these structures in the resins of the present invention was determined by comparisons of infrared spectra of model compounds containing tetrahydropyran structures with infrared spectra of the resins. Further evidence for the formation of the tetrahydropyran structure is also found in the limited reaction of the acid anhydrides and alcohols with the resin, which is far below the theoretical maximum that would be expected from Equations 1 and 2, combined with the complete disappearance of aldehyde groups from the infrared spectrum.

The polymethacroleins employed in the preparation of the products of the present invention are obtained by the polymerization of methacrolein in an aqueous medium in which the monomer is soluble, but in which the polymer is not soluble, and from which the polymer precipitates to form a dispersion. The formation of a polymer solution or a coagulated polymer is to be avoided since in either case the resulting polymer is insoluble, intractible and thus not suitable for further reaction. Although a large variety of free radical forming catalysts may be employed, "redox" catalysts are the preferred catalysts since they are generally more soluble in the medium and less dependent on temperature with respect to the rate of free radical formation. The quantity of the catalyst employed is critical and should not exceed .005 mol percent of the monomer calculated on the basis of the reducing agent. Higher concentrations lead to the formation of low molecular weight polymers. Redox catalysts which are suitable for the polymerization of methacrolein include such systems as hydrogen peroxide with thiourea, benzoyl peroxide with dimetyhl p-toluidine or soluble ferric phosphate, cupric oxide, cuprous oxide, nickel oxide, cobalt oxide, niobium oxide and vanadium pentoxide in combination with one or more of the following: sodium bisulfite, sodium thiosulphate, sodium formaldehyde sulfoxylate, sodium hypophosphite and sodium phosphite. The polymerization is furthermore carried out in the presence of a finely divided, inert solid, such as silica, alumina, titania, zirconia etc. It is only necessary to employ these solids in catalytic quantities. Since the solubility of methacrolein in water is low and more concentrated solutions of methacrolein are desirable for the preparation of polymethacroleins of higher molecular weight at more efficient polymerization rates preferred reaction media comprise miscible mixtures of alcohols and water. Alcohols suitable for such purposes are methanol, ethanol, isopropanol, butanol, etc. The monomer concentration in the reaction medium is maintained in a range of 7 to 40% by weight of the medium and preferably in the range of 25 to 40%; higher concentrations produce a two-phase reaction mixture and cause the coagulation of the polymer dispersons formed. The polymerization is carried out at temperatures below 50° C. and preferably at temperatures of 20° to 35° C. in the substantial absence of oxygen. The monomer employed should be extremely pure to obtain the best results. Commercial methacrolein should therefor be purified by distillation or other means prior to being employed in the polymerization.

A typical polymerization of methacrolein is as follows: into a clean three-necked 500 ml. flask equipped with stirrer, nitrogen inlet and outlet and thermometer is charged under nitrogen 275 ml. of distilled deoxygenated water, to which 0.25 ml. of tetraethyl orthosilicate is added drop-wise. To the reaction mixture is then added with agitation 75 ml. of deoxygenated methanol, 5 mg. of copper oxide and 0.8 ml. of a 1 percent solution of sodium bisulfite and 50 ml. of methacrolein. On addition of all of the reagents, agitation is stopped and polymerization is allowed to proceed undisturbed. The temperature is maintained at 25° C. The solution becomes opalescent after 20 minutes. Polymerization is continued for 20 hours. An antioxidant is added to the resulting polymer dispersion; the dispersion is then coagulated by the addition of sodium sulfate. The reaction mixture is filtered, the solid polymeric precipitate is washed with water and methanol, treated with a methanolic solution of an antioxidant and dried in a vacuum. The solid white polymer isolated is soluble in dimethyl formamide and has an inherent viscosity above 0.9 and can be molded into transparent films at a temperature of 250° to 275° C.

The polymethacrolein acylates and acetals of the present invention are prepared by reacting the polymer or a solution thereof with the anhydride or the alcohol in the presence of an acid catalyst dissolved in the anhydride or the alcohol. The catalysts that may be employed for the formation of the acylates and acetals are such well known acidic catalysts as sulfuric acid, p-toluene sulfonic acid, hydrogen chloride, phosphoric acid and polyphosphoric acid. A particularly preferred catalyst for the formation of the acylates and acetals is a solution (40 mol percent) of boron trifluoride in ortho-phosphoric acid. Solvents which are suitable for dissolving the polymethacrolein are dimethyl formamide, pyridine, dimethyl acetamide, dimethyl sulfoxide and tetramethylene-cyclic-sulfone.

The reaction is carried out at low temperatures in the range of −25° to +50° C. Higher temperatures should be avoided since they lead to discoloration and undesirable side reactions. Preferred temperatures are in the range of −15° to +10° C.

The acid anhydrides employed to form the polymethacrolein acylates are anhydrides of aliphatic and aromatic carboxylic acids such as acetic anhydride, butyric anhydride, caproic anhydride, caprylic anhydride and benzoic anhydride. In general acid anhydrides derived from acids having more than 10 carbon atoms are not employed since the reaction of polymethacrolein with the anhydrides of higher molecular weight acids is somewhat sluggish.

The alcohols employed in the formation of the acetals are aliphatic alcohols such as methanol, ethanol, butanol, isopropanol, decanol, aryl aliphatic alcohols, such as benzyl alcohol, alicyclic alcohols such as cyclohexanol and substituted alcohols containing halogen or sulphur radicals, such as ethylene chlorohydrin and 2- mercaptoethanol.

The formation of the novel polymethacrolein acylates and acetals is further illustrated by the following examples.

Example I

Into a reaction flask was charged 10 g. of finely divided polymethacrolein having an inherent viscosity in dimethyl formamide of 1.02. To the dry polymer was added with agitation 100 ml. of acetic anhydride and 0.25 ml. of ortho-phosphoric acid. The reaction mixture was stirred for 48 hours while maintaining the temperature from 0° to 50° C.; after 48 hours the polymer, initially insoluble in acetic anhydride, had completely dissolved. The reaction mixture was then neutralized with sodium bicarbonate and poured into excess water which caused the polymethacrolein derivative to precipitate. The polymer was repeatedly washed with dilute sodium bicarbonate solution, water and methanol until all traces of acetic anhydride, acetic acid and catalyst had been removed. The polymethacrolein acetate was found to have an inherent viscosity of 0.62, a softening point in the range of 230° to 260° C. and could be compression molded into transparent, rigid films at temperatures of 250° to 275° C. An analysis of the acetate groups by alkaline hydrolysis of the derivative in aqueous pyridine showed that the polymer contained 56% of the theoretical acetate groups possible, based on a complete reaction of acetic anhydride with the polymethacrolein to form polymethacrolein diacetate. Infrared analysis of the polymethacrolein acetate showed that the material contained essentially no aldehyde groups. Comparison of the infrared spectrum of 2,6-diacetoxy-3,5-dimethyl-5-methoxymethyl-tetrahydropyran with that of the polymer derivative showed substantially similarity which was indicative of the presence of the substituted tetrahydropyran structure in the polymethacrolein acetate.

Example II

Into a 500 ml. glass flask was charged 8.9 g. of finely divided polymethacrolein having an inherent viscosity of 1.15, 200 ml. of acetic anhydride and 0.6 ml. of a solution containing 40 mol percent of boron trifluoride in ortho-phosphoric acid. The temperature of the reaction mixture was maintained at −10° C. On stirring the reaction mixture for a period of 3 hours, the polymethacrolein initially insoluble in the acetic anhydride, had dissolved. The reaction mixture was neutralized and worked up as described in Example I. The polymethacrolein acetate obtained weighed 10.1 g. and was found to have an inherent viscosity of 0.93. The acetyl content of the resin was 59.4% of the theoretical maximum attainable on the basis of the diacetate. The polymer derivative could be molded at temperatures of 250° to 275° C. into stiff, transparent films. Infrared analysis of a film molded from the resin showed the presence of substituted tetrahydropyran rings in the resin and also showed essentially no unreacted aldehyde groups in the polymer derivative.

Example III

Employing the reaction procedure of Example II, 20 g. of polymethacrolein having an inherent viscosity of 1.22 was reacted with 400 ml. of acetic anhydride in the presence of a 40 mol percent boron trifluoride solution in ortho-phosphoric acid as the catalyst. The reaction temperature was maintained at −10° C. After 2 hours the polymer was completely dissolved and the reaction was complete. The polymethacrolein acetate isolated weighed 32.5 g., had an inherent viscosity of 1.19 and contained 56.6% of the theoretical maximum of acetate groups based on polymethacrolein diacetate.

Example IV

Employing the reaction procedure of Example I, 100 ml. of butyric anhydride was reacted with 10 g. of polymethacrolein having an inherent viscosity of 1.02 in the presence of 0.25 ml. of ortho-phosphoric acid as the catalyst. The polymer was completely dissolved after agitation for a period of 3 days. The temperature of the reaction mixture was maintained within a range of 0° to 50° C. After work-up there was obtained 13 g. of polymethacrolein butyrate having an inherent viscosity of 0.60. The resin contained 45.7% of the maximum butyrate groups possible on the basis of a theoretical polymethacrolein dibutyrate. The polymer could be molded at a temperature of 250° C. into rigid transparent films. The polymethacrolein butyrate was found to have a softening point in the range 205 to 211° C.

*Example V*

Employing the procedure of Example II, 2 g. of polymethacrolein having an inherent viscosity of 0.89 was reacted with 30 ml. of caproic anhydride employing 0.25 ml. of a 40 mol percent solution of boron trifluoride in ortho-phosphoric acid as the catalyst. The reaction was continued for 24 hours with agitation while maintaining the temperature within a range of 0° to 25° C. After work-up there was obtained 0.71 g. of polymethacrolein caproate having an inherent viscosity of 0.79.

*Example VI*

Employing the procedure of Example II, 50 ml. of caprylic anhydride was reacted with 3 g. of a polymethacrolein having an inherent viscosity of 1.10 employing 0.2 ml. of a 40 mol % solution of boron trifluoride in ortho-phosphoric acid as the catalyst. The reaction was continued for 7.25 hours at a temperature of 5° to 15° C. until solution of the initially insoluble polymethacrolein had occurred. After work-up there was obtained 4.65 g. of a polymethacrolein caprylate having an inherent viscosity of 0.55. The resin could be molded at a temperature of 250° C. into transparent films. The polymethacrolein caprylate was found to have a softening point in the range of 170° to 195° C.

*Example VII*

Into a 350 ml. flask equipped with a water separator was charged 39.5 g. of decanol, 50 ml. of benzene and 7 g. of polymethacrolein having an inherent viscosity of 0.75. To the reaction mixture was then added 0.1 g. of p-toluene sulphonic acid. The reaction mixture was refluxed for 6 hours in which time 1 ml. of water was removed from the reaction mixture, which was then allowed to stand at room temperature for an additional 8 days. The reaction mixture was then filtered. On washing and drying there was obtained 7.5 g. of a polymethacrolein decyl acetal. The polymer could be compression-molded into clear rigid films on heating to 275° C. Infrared analysis indicated substantial absence of aldehyde groups in the polymer.

*Example VIII*

Into a 250 ml. flask equipped with a water separator was charged 90 ml. of n-butanol, 6 g. of polymethacrolein having an inherent viscosity of 0.4, 50 ml. of toluene, and 0.2 g. of p-toluene sulfonic acid. The reaction mixture was refluxed for a period of 24 hours and allowed to stand for an additional two days. During reflux 0.5 ml. of water was collected and the polymer dissolved. At the end of the reaction the polymer was precipitated by pouring into methanol containing a little sodium methoxide. After filtering off the polymer, washing and drying, there was isolated 6.8 g. of polymethacrolein butyl acetal. The polymer could be compression molded at 275° C. into stiff, transparent films. Infrared analysis showed substantial absence of aldehyde groups in the polymer.

*Example IX*

Into a reaction flask there was charged 50 ml. of ethylene chlorohydrin and 5 g. of polymethacrolein having an inherent viscosity of 0.59. On solution of the polymethacrolein in the ethylene chlorohydrin, 0.1 ml. of a 40 mol percent solution of boron trifluoride in ortho-phosphoric acid was added. The resulting reaction mixture was allowed to stand at room temperature for a period of 6 days. The reaction mixture was then poured into 300 ml. of water containing 1.5 g. sodium carbonate, and the polymer precipitate was isolated, washed and dried. The product weighed 5 g. and was found to contain 3.3% chlorine corresponding to approximately 10% reaction to the completely acetalized derivative. A film molded at 275° C. was stiff and transparent. The infrared analysis showed substantial absence of aldehyde groups in the polymer derivative.

*Example X*

Into a 250 ml. glass reaction flask was charged 6 g. of polymethacrolein having an inherent viscosity of 1.4, 38 ml. of ethanol and 132 ml. of chloroform. The polymer dissolved in the mixed solvents and 0.1 g. toluene sulfonic acid was added. The reaction mixture was allowed to stand for 18 hours at room temperature. The reaction mixture was then neutralized with sodium bicarbonate, filtered and precipitated by adding cyclohexane. The polymer was collected by filtration and dried. The resulting polymethacrolein acetal was found to have an inherent viscosity of 0.5.

*Example XI*

Into a reaction flask was charged 5 g. of polymethacrolein having an inherent viscosity of 0.8 and 50 ml. of 2-mercaptoethanol. The polymer dissolved in the reagent and 0.3 ml. of a 40 mol percent solution of boron trifluoride in ortho-phosphoric acid was added. The reaction mixture was allowed to stand at room temperature for a period of 24 hours. The reaction mixture was neutralized with sodium carbonate, filtered and precipitated with methanol. The polymer was collected by filtration, washed with methanol and dried. The resulting polymethacrolein thioacetal weighed 4.2 g. and was found to contain 4.5% of sulfur, which corresponded to approximately 15% reaction to the theoretically completely acetalized derivative. A film molded at 275° C. was stiff and transparent. The infrared analysis of the film showed a substantial absence of aldehyde groups in the polymer derivative.

The examples have illustrated the formation of novel derivatives from soluble high molecular weight polymethacrolein. The molecular weight of the polymethacrolein derivatives of the present invention are sufficiently high enough to make these derivatives of value in plastic applications. The molecular weight of the polymers is best determined by employing a relative measure such as inherent viscosity. The inherent viscosity measurements enumerated in the above examples were obtained by employing a 0.5% solution of the polymer derivative in dimethylformamide and measuring the viscosity of the solution and the solvent at 35° C. and calculating the inherent viscosity from the following equation:

$$\eta \text{ inh} = \ln\left(\frac{t}{t_0}\right) \times \frac{1}{c}$$

where $t_0$ is the viscosity of the solvent and $t$ the viscosity of the solution and $c$ the concentration of the polymer in grams per 100 cc. of solvent.

The softening points were obtained by passing a sample of the polymer across a hot stage under slight pressure. The temperature at which the polymer leaves a trail of molten polymer is considered the softening point temperature of the polymer.

The polymethacrolein derivatives of the present invention fuse to colorless transparent films. The polymethacrolein acylates and acetals of the present invention can be cast into sheets and films from solutions in organic solvents; they may also be fabricated into shaped articles by compression molding, fibers may be prepared from the derivatives by solution spinning. The polymer may be employed in the manufacture of ornamental designs, lighting fixtures and outdoor signs. The polymethacrolein derivatives may be further stabilized by the inclusion of light stabilizers, antioxidants and other additives. Pigments, fillers and other polymeric materials may be blended with the polymethacrolein derivatives. The polymethacrolein derivatives have improved retention of mechanical properties at elevated temperatures as compared to the unmodified polymethacrolein and are more soluble in common organic solvents. This is believed to be in part due to the substituted tetrahydropyran structure which forms during the reaction leading to the derivatives of the present invention.

We claim:

1. A normally solid, high molecular weight polymethacrolein acylate substantially free from aldehyde groups, as measured by infrared spectrographic analysis, and containing less than 65% of the maximum theoretical acyl groups, as measured by hydrolysis, said polymethacrolein acylate being characterized by the presence of tetrahydropyrane rings in the polymer chain, the molecular weight of said polymethacrolein acylates being at least high enough to result in an inherent viscosity of 0.55 as measured by a 0.5 weight percent solution of the polymethacrolein acylate in dimethyl formamide at 35° C., the acylate groups in said polymethacrolein acylate containing from 2 to 10 carbon atoms.

2. A normally solid polymethacrolein acylate as set forth in claim 1 wherein the acylate radical is an acetate radical.

3. A normally solid polymethacrolein acylate as set forth in claim 1 where the acylate radical is a butyrate radical.

4. A normally solid polymethacrolein acylate as set forth in claim 1 where the acylate radical is a caprylate radical.

5. The product of claim 1 in film form.

References Cited in the file of this patent

UNITED STATES PATENTS

| | | |
|---|---|---|
| 2,478,154 | Evans | Aug. 2, 1949 |
| 2,819,252 | Shokal | Jan. 7, 1958 |

FOREIGN PATENTS

| | | |
|---|---|---|
| 596,620 | Great Britain | Jan. 7, 1948 |